US009235702B2

(12) United States Patent
Arnold et al.

(10) Patent No.: US 9,235,702 B2
(45) Date of Patent: *Jan. 12, 2016

(54) PERSONAL IDENTIFICATION NUMBER SECURITY ENHANCEMENT

(71) Applicant: International Business Machines Corporation, Armonk, NY (US)

(72) Inventors: Todd W. Arnold, Charlotte, NC (US); Elizabeth A. Dames, Concord, NC (US); Carsten D. Frehr, Farum (DK); Clifford L. Hansen, Rochester, MN (US); Shelia M. Sittinger, Lombard, IL (US)

(73) Assignee: International Business Machines Corporation, Armonk, NY (US)

(*) Notice: Subject to any disclaimer, the term of this patent is extended or adjusted under 35 U.S.C. 154(b) by 477 days.

This patent is subject to a terminal disclaimer.

(21) Appl. No.: 13/676,585

(22) Filed: Nov. 14, 2012

(65) Prior Publication Data

US 2013/0073863 A1  Mar. 21, 2013

Related U.S. Application Data

(63) Continuation of application No. 13/099,509, filed on May 3, 2011, now Pat. No. 8,639,938.

(51) Int. Cl.
*G06F 21/46* (2013.01)
*G06F 21/31* (2013.01)
(Continued)

(52) U.S. Cl.
CPC ........... *G06F 21/46* (2013.01); *G06F 21/31* (2013.01); *G06Q 20/382* (2013.01); *G06Q 20/4012* (2013.01); *G07F 7/1016* (2013.01); *G07F 7/1075* (2013.01); *G07F 7/1091* (2013.01); *G07F 19/211* (2013.01)

(58) Field of Classification Search
CPC ...................................... G06F 21/46
See application file for complete search history.

(56) References Cited

U.S. PATENT DOCUMENTS 4,186,871 A * 2/1980 Anderson et al. ............ 705/71
4,924,514 A * 5/1990 Matyas et al. ................ 705/71
(Continued)

OTHER PUBLICATIONS

Bleha et al.; Computer-access security systems using keystroke dynamics; Published in: Pattern Analysis and Machine Intelligence, IEEE Transactions on (vol. 12, Issue: 12); pp. 1217-1222; Date of Publication: Dec. 1990; IEEE Xplore.*

(Continued)

*Primary Examiner* — Bradley Holder
(74) *Attorney, Agent, or Firm* — Cantor Colburn LLP; Steven Chiu

(57) ABSTRACT

A method that includes receiving, from a first entity having an input permission, a first data structure into a HSM, wherein the first data structure maps a first many-to-one mapping between a first and a second PIN numeral system. The method also includes determining whether the content of the first data structure is valid, storing the first data structure in the HSM if the first data structure is valid and marking the stored first data structure as inactive. The method further includes activating the first data structure if a second data structure is input into the HSM by a second entity having an activation permission, wherein the first entity is different from the second entity, the first data structure is identical to the second data structure. The method additionally includes converting from the first to the second PIN numeral system responsive to the activated first data structure.

7 Claims, 11 Drawing Sheets

(51) Int. Cl.
*G07F 19/00* (2006.01)
*G06Q 20/38* (2012.01)
*G06Q 20/40* (2012.01)
*G07F 7/10* (2006.01)

(56) References Cited

U.S. PATENT DOCUMENTS

| | | | | |
|---|---|---|---|---|
| 5,301,231 | A * | 4/1994 | Abraham et al. | 713/191 |
| 8,186,586 | B2 * | 5/2012 | Maddocks | 235/382.5 |
| 2001/0027528 | A1 * | 10/2001 | Pirkey et al. | 713/202 |
| 2002/0152180 | A1 * | 10/2002 | Turgeon | 705/72 |
| 2005/0149739 | A1 * | 7/2005 | Hopkins et al. | 713/184 |
| 2008/0077986 | A1 * | 3/2008 | Rivera et al. | 726/20 |
| 2008/0178006 | A1 * | 7/2008 | Mullor et al. | 713/184 |
| 2008/0288403 | A1 * | 11/2008 | von Mueller | 705/44 |
| 2010/0308109 | A1 * | 12/2010 | Maddocks | 235/382.5 |
| 2010/0308110 | A1 * | 12/2010 | Maddocks | 235/382.5 |
| 2010/0312709 | A1 * | 12/2010 | Maddocks | 705/72 |

OTHER PUBLICATIONS

Mallat et al.; Mobile banking services; Published in: Magazine Communications of the ACM—New architectures for financial services CACM Homepage archive; vol. 47 Issue 5, May 2004; pp. 42-46; ACM Digital Library.*

Mike Bond & Piotr Zielinski, "Decimalisation Table Attacks for PIN Cracking," Universtiy of Cambridge; TechReport; 2003.

* cited by examiner

PERSONAL IDENTIFICATION NUMBER SECURITY ENHANCEMENT

CROSS-REFERENCE TO RELATED APPLICATION

This application is a continuation of U.S. patent application Ser. No. 13/099,509, filed May 3, 2011, the content of which is hereby incorporated by reference in its entirety.

BACKGROUND

The present invention relates to data processing, and more specifically, to enhancing security of personal identification numbers (PINs).

A PIN is a secret numeric password shared between a user and a system that can be used to authenticate the user to the system. Typically, a PIN is a quantity derived from a function of an account number and a PIN generating cryptographic key, and other inputs, such as a decimalization table. This derived quantity is used by an individual to identify himself/herself to the system. Generally, the user is required to provide a non-confidential user identifier (a user ID) and a confidential PIN to gain access to the system. Upon receiving the user ID and the PIN, the system looks up the PIN based upon the user ID and compares the looked-up PIN with the received PIN. The user is granted access only when the number entered matches with the number stored in the system.

Typically, PINs for payment cards are generated by encrypting the card number under a secret key held securely by a payment card issuing entity, such as a bank. The encryption produces a hexadecimal value with digits in the range 0 to 9 and A to F. A PIN decimalization table is then used to convert the hexadecimal value to a PIN with digits in the range 0 to 9, for instance mapping A to 0, B to 1. When a transaction is authorized, the PIN is verified when the entity's software sends the encrypted PIN to a hardware security module (HSM), which then indicates whether the PIN was correct or not. Some HSMs require the entity's software to send the PIN decimalization table to the HSM, which is often located at the entity. Thus, a PIN decimalization table attack is the technique where a corrupt entity insider, such as a computer programmer, with access to the entity's HSM, manipulates the PIN decimalization table in order to guess the PIN quicker than should otherwise be possible.

One approach to reducing an occurrence of the PIN decimalization table attack has been to cryptographically protect the PIN decimalization table input so that only authorized PIN decimalization table can be used i.e. specify an approved set of PIN decimalization tables for the HSM. However, using encryption to protect PIN decimalization tables prohibits revocation of decimalization tables, such as during a security breach. Further, encrypted PIN decimalization tables are not transparent to the software application because the software application must possess the encrypted version of the PIN decimalization table and the encryption key used to encrypt the PIN decimalization table generally cannot be changed without impact on the software application and its data. Also, application programming interface (API) calls to the HSM may need new or modified parameters upon use of a new or a modified encrypted PIN decimalization table.

BRIEF SUMMARY

According to one embodiment of the present invention, a computer-implemented method for enhancing security of a personal identification number is provided. The method includes receiving, from a first entity having an input permission, a first data structure into a hardware security module, wherein the first data structure maps a first many-to-one mapping between a first personal identification number numeral system and a second personal identification number numeral system. The method also includes determining, in the hardware security module, whether the content of the first data structure is valid. The method further includes storing the first data structure in the hardware security module in response to determining that the content of the first data structure is valid. The method even further includes marking, in the hardware security module, the stored first data structure as inactive. The method yet even further includes activating, by marking as active, within the hardware security module, the marked inactive first data structure if a second data structure is input into the hardware security module by a second entity having an activation permission, wherein the first entity is different from the second entity, the content of the first data structure is identical to the content of the second data structure, which maps a second many-to-one mapping between the first personal identification number numeral system and the second personal identification number numeral system. The method additionally includes converting from the first personal identification number numeral system to the second personal identification number numeral system responsive to the activated first data structure stored in the hardware security module.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter, which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

The disclosed technology enhances PIN security from PIN decimalization table attacks with minimum modifications to the PIN decimalization table and its supporting infrastructure.

Exemplary embodiments of the invention enable protection of a PIN decimalization table by securely storing an approved PIN decimalization table within the HSM and enabling a multiple party control system to invoke functions associated with the PIN decimalization table. Requiring a second approval to invoke functions associated with the stored PIN decimalization table ensures that one insider cannot breach the security of the pre-approved PIN decimalization table. For example, a PIN decimalization table can be protected by storing an approved PIN decimalization table within the HSM and separating permissions (similar to a two-man rule) to load the PIN decimalization table, to activate the PIN decimalization table, to delete the PIN decimalization table and to require use of the validated PIN decimalization table.

HSM is a tamper-resistant coprocessor that runs software providing cryptographic and security related services. HSM's API is designed to protect the confidentiality and integrity of data, while still permitting access according to a configurable usage policy. Typical financial APIs contain transactions to generate and verify PINs, translate guessed PINs between different encryption keys as the PINs travel between banks and support a whole host of key management functions. HSM's usage policy is typically set to allow anyone with access to the host computer to perform everyday commands, such as PIN verification, but to ensure that sensitive functions such as loading new keys can only be performed with authorization from multiple employees who are trusted not to collude. HSM may include a central processing unit, an encryption hardware device, random access memory device, a persistent memory device and a hardware random number generator. HSM can be a plug-in card or an external TCP/IP security device that can be attached directly to the server or a general purpose computer. Some examples of HSM include IBM® PCIe Cryptographic Coprocessor (CEX3C/4765) and IBM® PCI-X Cryptographic Coprocessor (PCIXCC).

A PIN decimalization table is a type of a data structure that enables a many-to-one mapping between hexadecimal digits and decimal numeric digits and may be used to convert ciphertext into a PIN. An example of a PIN decimalization table is 0123456789012345, which may map 0123456789ABCDEF hexadecimal digit. Although, for simplicity and clarity, the following description is directed to protecting a PIN decimalization table, the present invention may be used with any many-to-one mapping between at least two digits of at least one numeral system.

Figure 1:
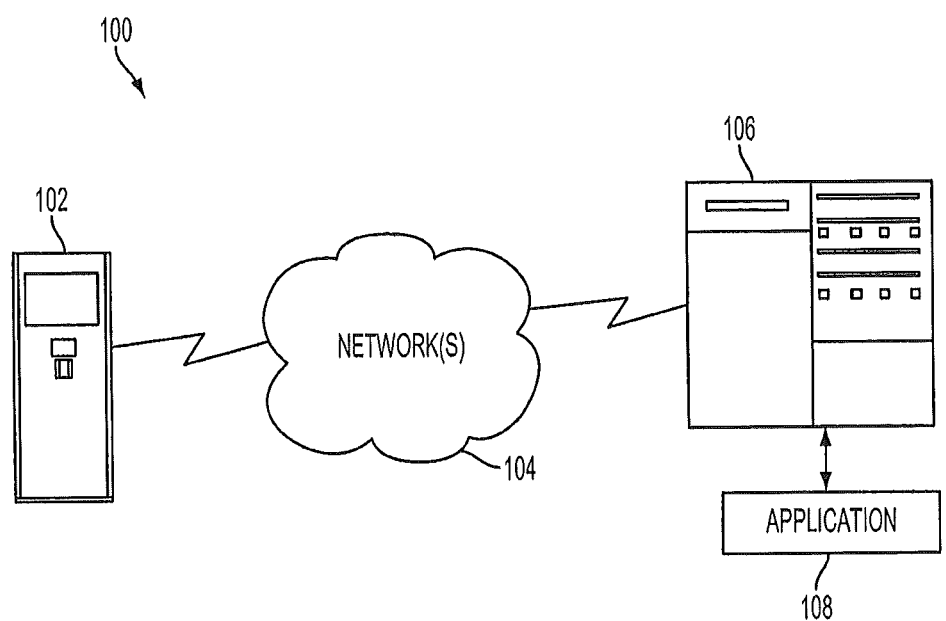
FIG. 1 shows a schematic block diagram of an exemplary embodiment of a system in which PIN security may be enhanced.

FIG. 1 shows a schematic block diagram of an exemplary embodiment of a system in which PIN security may be enhanced.

A system 100 includes a user system 102 in communication over one or more networks 104 with a host system 106.

The user system 102 represents a first party that submits account number and PIN information to be communicated to a second party, such as the host system 106. The user system 102 may be a point of sale (POS) terminal that is implemented using a computer executing a computer program for carrying out a POS related process. The user system 102 may be payment terminal, such as an automated teller machine (ATM) or kiosk, configured to receive user information, such as account information or account PIN.

One or more networks 104 may be any type of known networks including, but not limited to, a wide area network (WAN), a local area network (LAN), a virtual private network (VPN), an intranet and a global network, such as Internet. The network 104 may be implemented using a wireless network or any kind of physical network implementation known in the art. The user system 102 may be coupled to the host system 106 through multiple networks, such as intranet and Internet. One or more of the user system 102 and the host system 106 may be connected to the one or more networks 104 via wired or wireless technology. In one embodiment, the one or more networks 104 is an intranet and one or more of the user system 102 executes a user interface application, such as a web browser, to contact the host system 106 through the one or more networks 104. In another embodiment, one or more of the user system 102 is connected directly, i.e., not through the one or more networks 104, to the host system 106.

The host system 106 may include a processor, memory, input/output (IO) devices and an HSM. The host system 106 depicted may be implemented using one or more servers operating in response to a computer program stored in a storage medium accessible by the server. Typically, user IDs and corresponding PIN data reside in memory within the host system 106.

An application 108 be running on the host system 106 or may be running on another system in communication with the host system 106. The application 108 may use the HSM on the host system 106 to perform HSM related processes.

In one embodiment, a user of the user system 102 provides a user ID and an input PIN to obtain permission to retrieve money from an ATM or to receive permission to use a payment card for a purchase at a POS terminal. Upon successful entry of the user ID and the input PIN, the user ID and the input PIN are encrypted and transmitted from the user system 102 to the application 108 via the one or more networks 104. Upon receiving the user ID and the input PIN, the application 108 retrieves an encrypted stored PIN based upon the provided user ID. Then, the application 108 sends the encrypted stored PIN and the encrypted input PIN to the HSM, which then decrypts and compared the values of the stored PIN and the input PIN. If the values of the stored PIN and the input PIN are equal, then the user is granted permission via the application 108. If the user is not granted permission via the application 108, then the values of the stored PIN and the input PIN are not equal.

Figure 2:
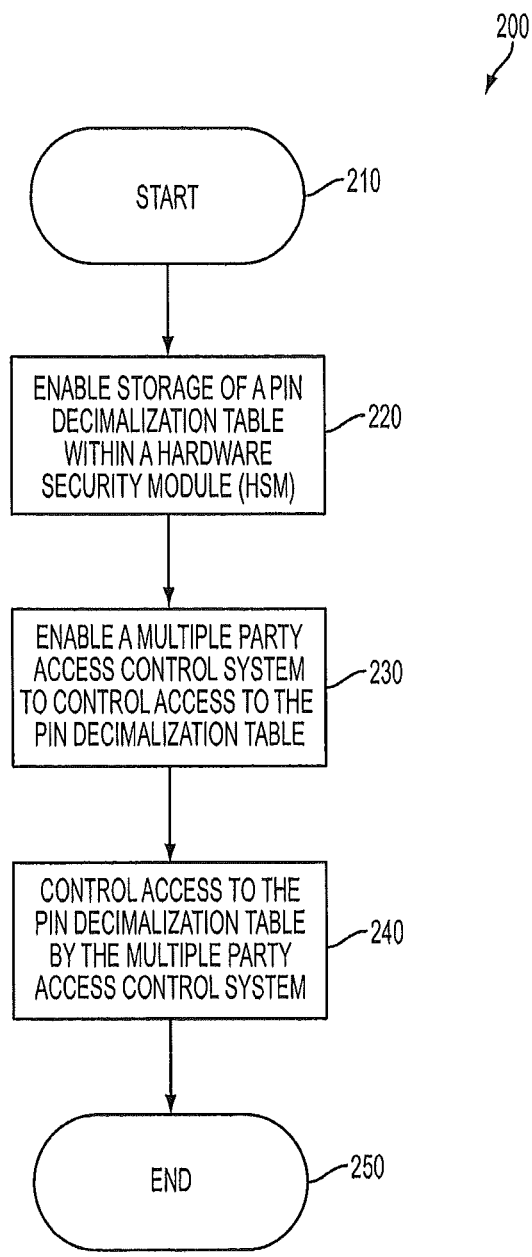
FIG. 2 shows a flowchart of an exemplary embodiment of a process to enhance security of a PIN decimalization table.

FIG. 2 shows a flowchart of an exemplary embodiment of a process to enhance security of a PIN decimalization table.

A process 200 includes a block 210, a block 220, a block 230, a block 240 and a block 250. Process 200 may be performed in the host system 106.

In the block 210, process 200 is started. In one embodiment, process 200 may be started manually or automatically.

In the block 220, storage of a PIN decimalization table is enabled within a HSM. The storage of the PIN decimalization table within the HSM is known in the art.

In the block 230, a multiple party access control system is enabled in order to control access to the PIN decimalization table.

In one embodiment, at least three types of access control system permissions are available for the multiple party access control system. A first type of permission is a load permission, which allows a user to store a cleartext PIN decimalization table within the HSM. A second type of permission is an activate permission, which allows the user to activate a cleartext PIN decimalization table already stored in the HSM, but not yet activated. A third type of permission is a delete permission, which allows the user to delete or erase any PIN decimalization table stored in the HSM, whether activated or not. The user may be granted access to one, all or any other combination of the first, the second and the third permission types. However, if the load permission and the activate permissions are granted to the same user, then security of the PIN decimalization table may be compromised.

In one embodiment, a software application, such as the application 108 described in reference to FIG. 1, may have multiple PIN processing functions, such as five PIN processing functions, which test for an access control permission to require that any PIN decimalization table used be identical to one of the activated PIN decimalization tables stored within the HSM.

A first function, which requires that the load permission be present, is used to manage the storage for the decimalization tables within the HSM. The first function uses a cleartext PIN decimalization table, such as a 16-byte PIN decimalization table, and a table identifier, to test the PIN decimalization table for validity and store the PIN decimalization table within the HSM. For example, the validity test may include verifying that the PIN decimalization table contains only ASCII digits 0 through 9. The PIN decimalization table is marked as inactive if only the load permission is granted or active if both the load and the activate permissions are granted. However, if the load permission and the activate permissions are granted to the same user, security of the PIN decimalization table may be compromised.

A second function, which requires that the activate permission be present, is used to activate the already loaded PIN decimalization table. The second function uses a cleartext decimalization table, such as a 16-byte PIN decimalization table, and the table identifier, to validate that the presented PIN decimalization table is identical to the PIN decimalization table stored in the HSM with the same identifier, and mark the stored PIN decimalization table as active. The presentation of the table and the comparison are performed to ensure that multiple users (similar to a two-man rule) agree that the desired PIN decimalization table is to be used.

A third function, which requires that the delete permission be present, is used to delete any PIN decimalization table (either in the inactive or the active state), which is stored within the HSM. For additional security, the third function can be used to erase a PIN decimalization table no longer in use.

A fourth function is used to display the PIN decimalization table, which is present in the HSM, as well as to determine as to whether the PIN decimalization table is in the inactive state or the active state. The fourth function may be used as an additional check and the fourth function has no security permission requirement because PIN decimalization table is not secret data.

A fifth function is used to specify a requirement for PIN decimalization table validation in order to force the use of only the active PIN decimalization table, which can be found within the HSM. In one embodiment, if the access control system permissions are configurable and a user desires to avoid the invocation of the second function, the invocation of the second function is turned off and the PIN decimalization table can be loaded and activated without the access control system permissions. Thus, if the PIN decimalization table validation must be performed, then the PIN decimalization table provided with a PIN block, which comprises a PIN and a personal account number (PAN), is compared to the PIN decimalization table stored within the HSM and, upon matching, the PIN decimalization table, which is stored within the HSM, marked as active is used in the generation or verification of the PIN. If a non-matching PIN decimalization table is presented, such as either in the inactive state or not present at all, then an error message is issued.

In the block 240, access to the PIN decimalization table is controlled via the multiple party access control system. In one embodiment, the implementation of the access control system permissions and at least the first function and the second function requires no changes to customer applications accessing the application 108 because the security personnel handle the loading of the PIN decimalization table, the activation of the PIN decimalization table, and then, if desired, the enablement the PIN decimalization table validation requirement. Thus, the customer applications may seamlessly use the validated PIN decimalization table since this approach is advantageous over the encrypted PIN decimalization table approach, which requires the application programs to provide an encrypted table rather than a clear one.

In the block 250, process 200 ends.

FIG. 3-10 show block diagrams of various exemplary implementations of the method described in FIG. 2.

FIGS. 3-10 indicate the expected behavior of the five functions when used to update multiple PIN decimalization tables on the HSM. The diamond shape symbolizes at least one of the at least three types of access control system permissions, which are available for the multiple party access control system. Each PIN decimalization table is labeled "A" if the PIN decimalization table is in the active state, which is currently valid for use, or "I" if the PIN decimalization table is in the inactive state, which is stored in the HSM, but not activated by a user with the correct permission. The initial state of the stored PIN decimalization tables within the HSM is on the left-hand side of the figure and the resulting state, which depends on which user above makes the request, is on the right-hand side or the bottom of the figure. For simplicity and clarity, exemplary PIN decimalization tables include 5 slots.

In one embodiment, there are seven users of the multiple party access control system.

User A has permission to load a PIN decimalization table.

User B has permission to delete a PIN decimalization table.

User C has permission to activate a PIN decimalization table.

User D has permission to load and delete a PIN decimalization table.

User E has permission to delete and activate PIN decimalization table.

User F has permission to load and activate a PIN decimalization table.

User G has permission to load, activate and delete a PIN decimalization table.

Figure 3:
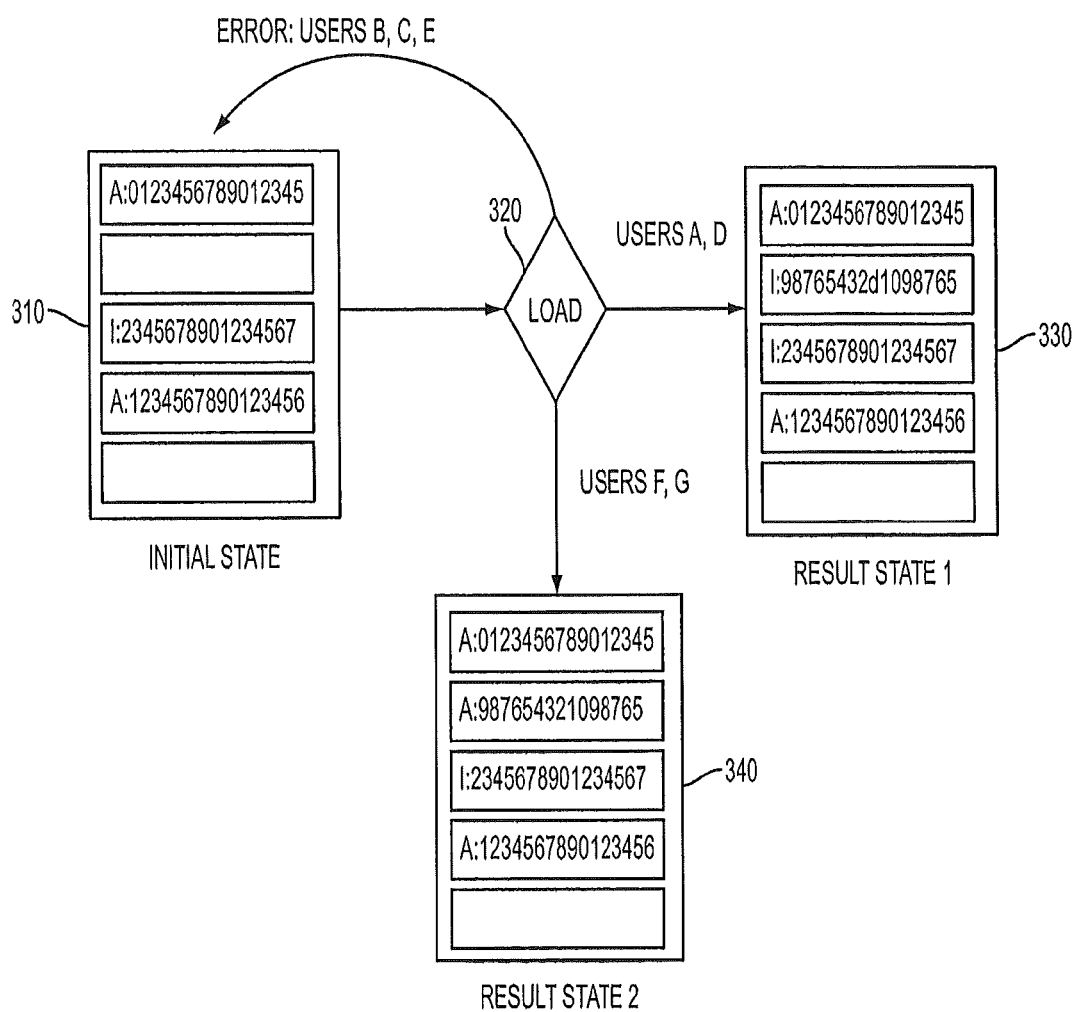
FIG. 3-10 show block diagrams of various exemplary implementations of the method described in FIG. 2.

In FIG. 3, users A, B, C, D, E, F and G request to perform a load function 320 to load a PIN decimalization table number 2 with the PIN decimalization table "9876543210987654". Initial state, result state 1 and result state 2 of an HSM are indicated as 310, 330 and 340, respectively.

As shown in result state 330, since users A and D have permission to load PIN decimalization tables, when users A and D request to load the PIN decimalization table "9876543210987654" over empty PIN decimalization table 2, the PIN decimalization table "9876543210987654" is stored on the HSM and marked as inactive.

As shown in result state 340, since users F and G have permission to load and activate tables, when users F and G request that the PIN decimalization table 2 be loaded with the PIN decimalization table "9876543210987654", the PIN decimalization table 2 is loaded with "9876543210987654" string and then immediately placed in the active state.

Since users B, C and E do not have permission to load PIN decimalization tables, an error is returned.

Figure 4:
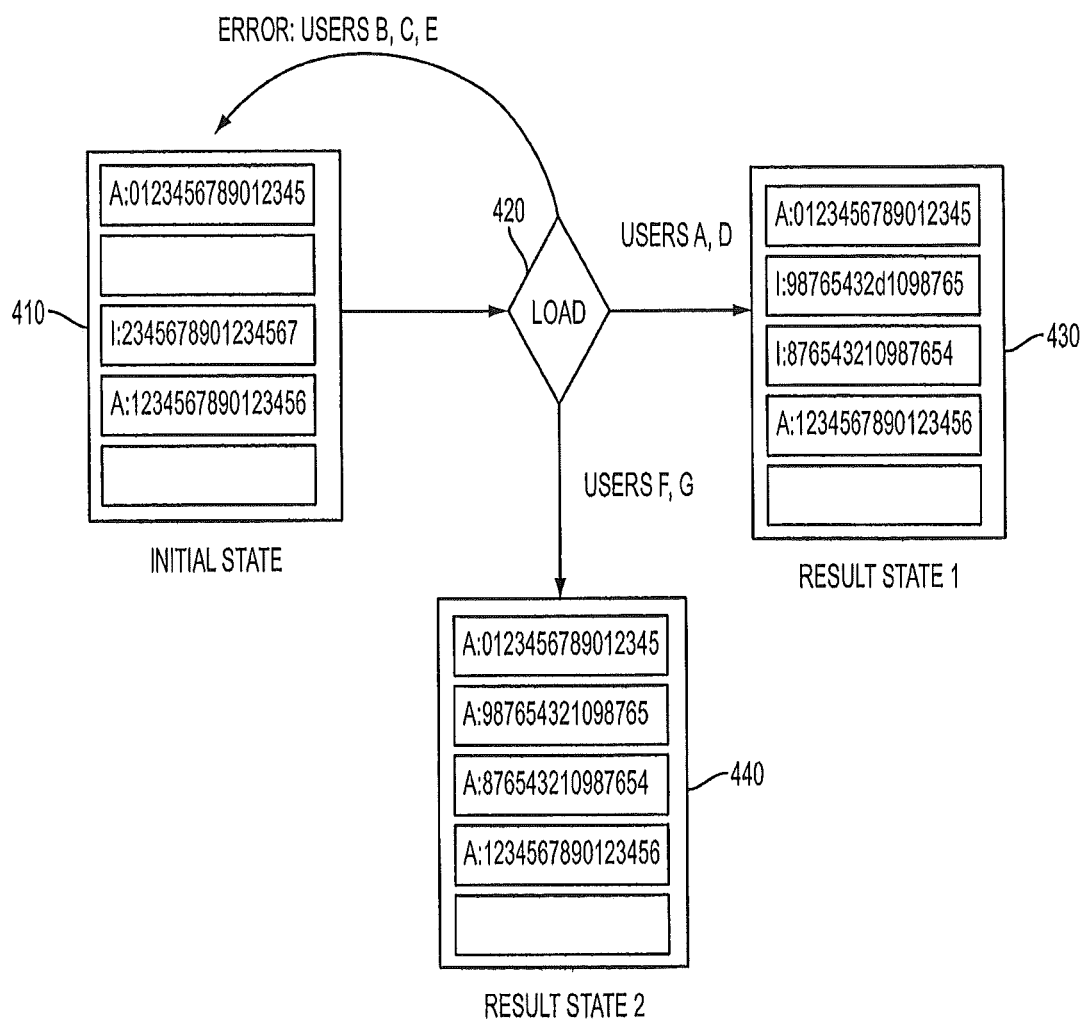

In FIG. 4, users A, B, C, D, E, F and G request to perform a load function 420 to load PIN decimalization table 2 with the string "9876543210987654" and PIN decimalization table 3 with the string "8765432109876543." Initial state, result state 1 and result state 2 of an HSM are indicated as 410, 430 and 440, respectively.

As shown in result state 1, since users A and D have permission to load PIN decimalization tables, users A and D can overwrite the inactive PIN decimalization table 3 as well as the empty PIN decimalization table 2.

As shown in result state 2, since users F and G have permission to both load and activate PIN decimalization tables, the PIN decimalization tables are automatically activated after being loaded.

Since users B, C and E do not have permission to load PIN decimalization tables, an error is returned.

Figure 5:
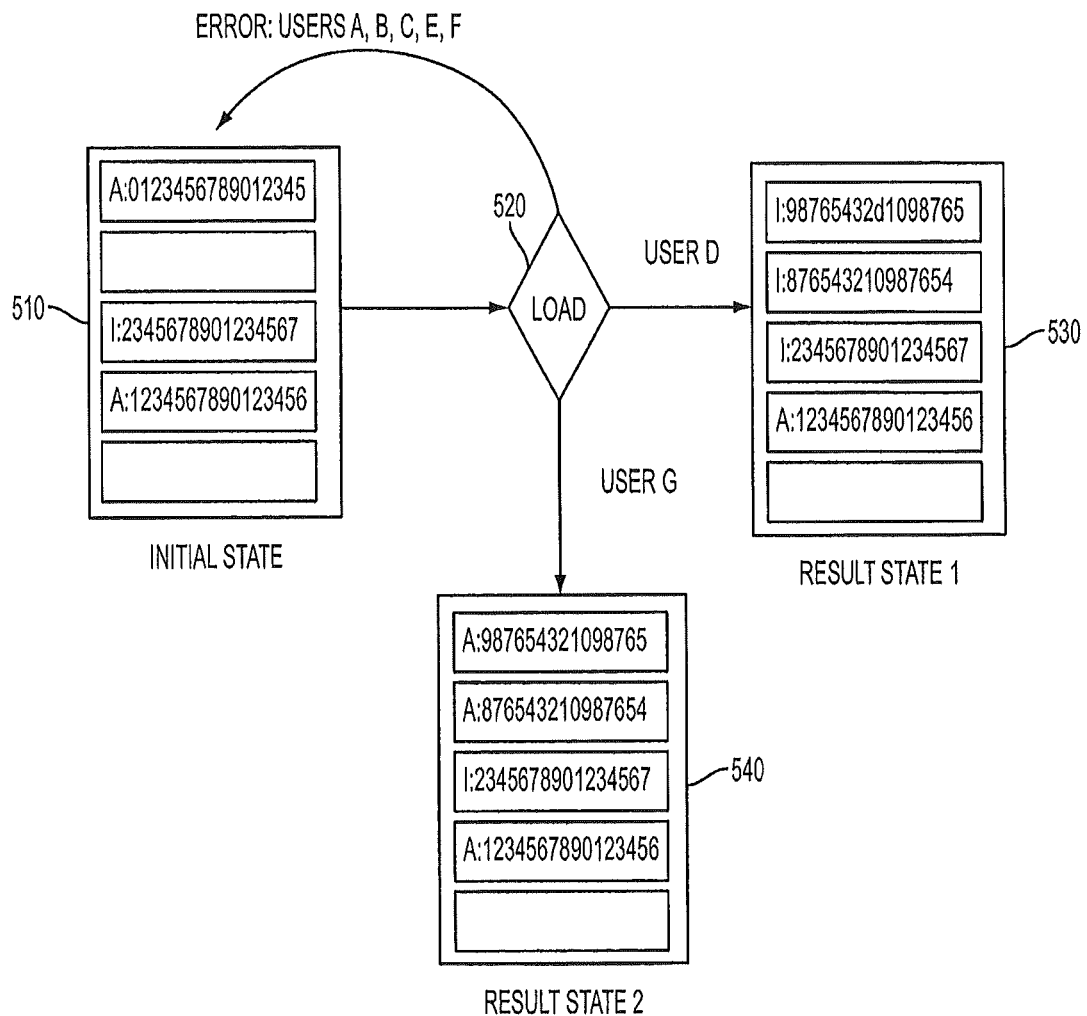

In FIG. 5, users A, B, C, D, E, F and G request to perform a load function 520 to load PIN decimalization table 1 with the string "9876543210987654" and PIN decimalization table 2 with the string "8765432109876543." Initial state, result state 1 and result state 2 of an HSM are indicated as 510, 530 and 540, respectively.

As shown in result state 1, since user D has permission to load and delete PIN decimalization tables, active PIN decimalization table 1 may be overwritten. The new PIN decimalization tables 1 and 2 are in the inactive state because user D does not have permission to activate PIN decimalization tables.

As shown in result state 2, since user G has permission to load, delete, and activate PIN decimalization tables, PIN decimalization table 1 is overwritten and the new PIN decimalization tables 1 and 2 are placed in the active state.

Since users B, C and E do not have permission to load PIN decimalization tables, an error will be returned and no PIN decimalization tables are changed.

Since users A and F do not have permission to delete PIN decimalization tables, an error will be returned and no tables are changed.

Figure 6:
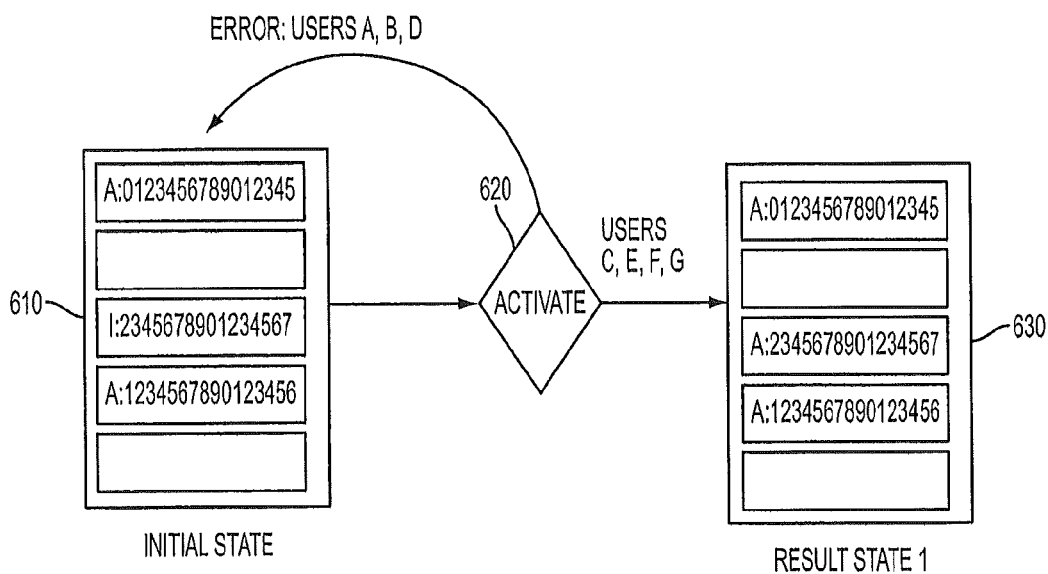

In FIG. 6, users A, B, C, D, E, F and G request to perform activation 620 by marking PIN decimalization table 3 as active with the PIN decimalization table "2345678901234567. Initial state and result state 1 of an HSM are indicated as 610 and 630, respectively.

As shown in result state 1, since users C, E, F and G have permission to activate the PIN decimalization tables and the PIN decimalization tables are the same (table 3), the inactive PIN decimalization table is placed in the active state.

Since users A, B and D do not have permission to activate the PIN decimalization tables, an error is returned.

Figure 7:
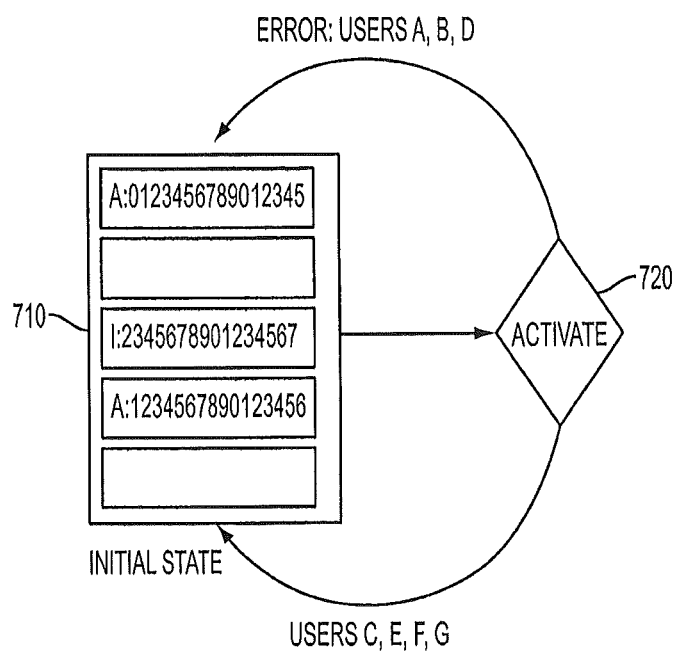

In FIG. 7, users A, B, C, D, E, F and G request to perform activation 720 by marking PIN decimalization table 3 as active with the string 987654321098765." Initial state of an HSM is indicated as 710.

Since users A, B and D do not have permission to activate PIN decimalization tables, an error is returned.

Since the input PIN decimalization table does not match the inactive PIN decimalization table, a different error is returned for users C, E, F and G.

Figure 8:
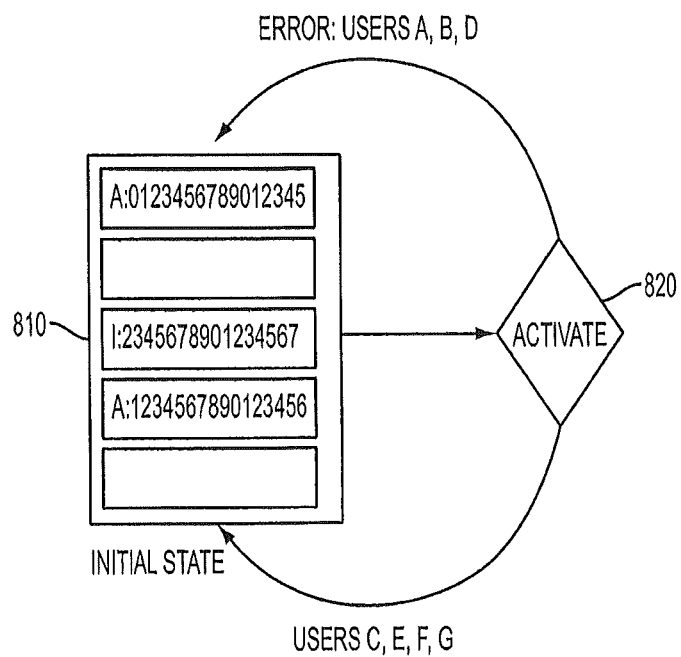

In FIG. 8, users A, B, C, D, E, F and G request to perform activation 820 by marking PIN decimalization table 1 as active with the string "0123456789012345" and PIN decimalization table number 3 as active with the string "2345678901234567." Initial state of an HSM is indicated as 810.

Since users A, B and D do not have permission to activate PIN decimalization tables, an error is returned.

Since one of the PIN decimalization tables to be activated (PIN decimalization table 1) is already in the active state, another error is returned for users C, E, F and G and no PIN decimalization tables are changed. This error is part of the two-party control of the system because no table should be re-validated since re-validation indicates a failure in the multiple party access control system.

Figure 9:
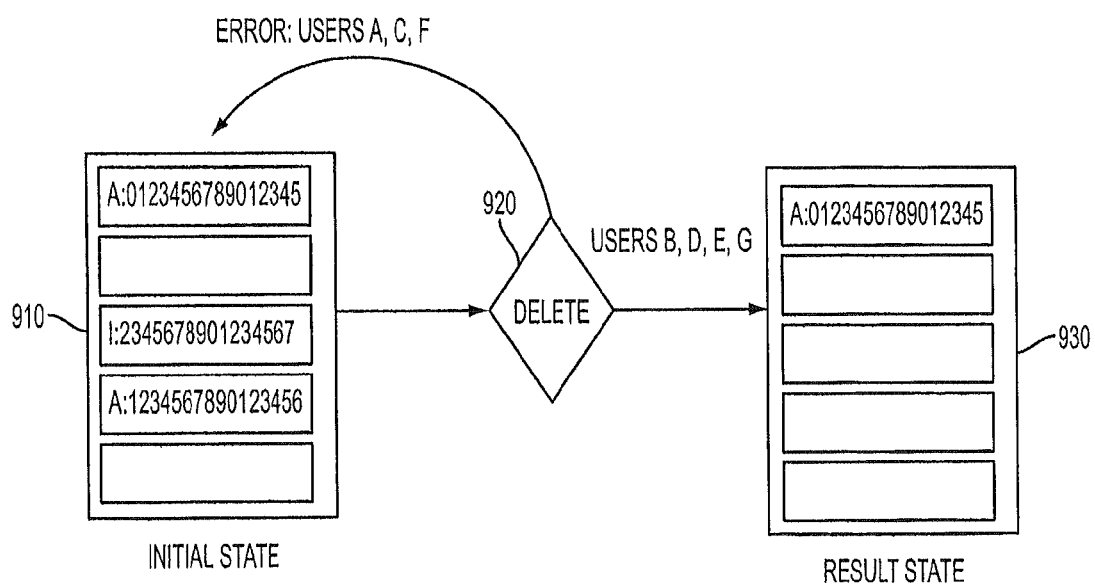

In FIG. 9, users A, B, C, D, E, F and G request to perform a delete function 920 of PIN decimalization tables 3 and 4. Initial state and result state of an HSM are indicated as 910 and 930, respectively.

Since users A, C and F do not have permission to delete a PIN decimalization table, an error is returned.

As shown in result state 930, since users B, D, E and G do have permission to delete a PIN decimalization table, the indicated PIN decimalization tables are deleted.

Figure 10:
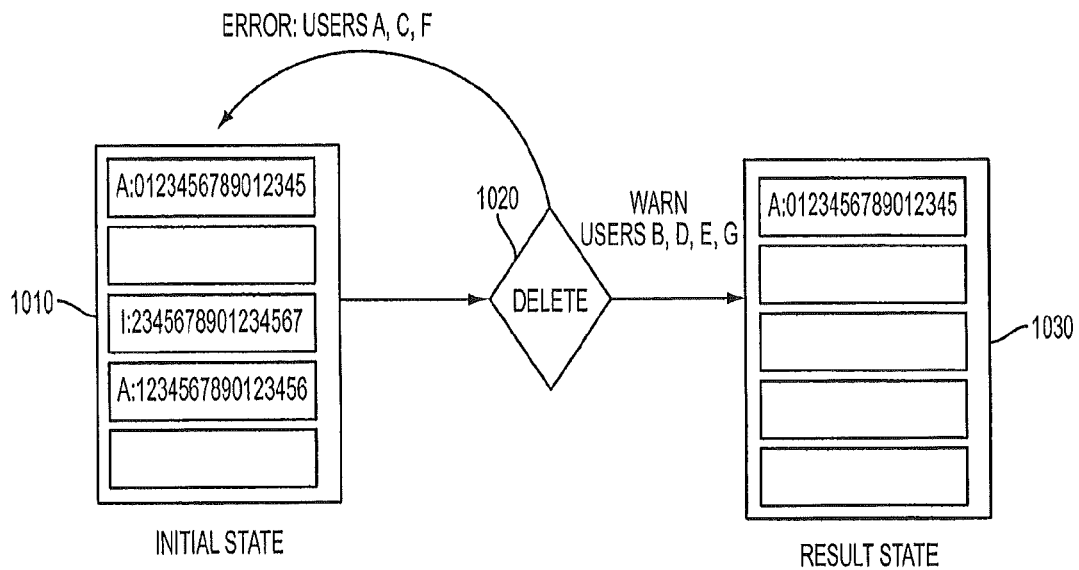

In FIG. 10, users A, B, C, D, E, F and G request to perform a delete function 1020 to delete PIN decimalization tables 2, 3 and 4. Initial state and result state of an HSM are indicated as 1010 and 1030.

Since users A, C and F do not have permission to delete a PIN decimalization table, an error is returned.

As shown in result state 1030, since users B, D, E and G do have permission to delete a PIN decimalization table, the indicated PIN decimalization tables are deleted. However, a warning message will also be returned because PIN decimalization table 2 is already empty.

Figure 11:
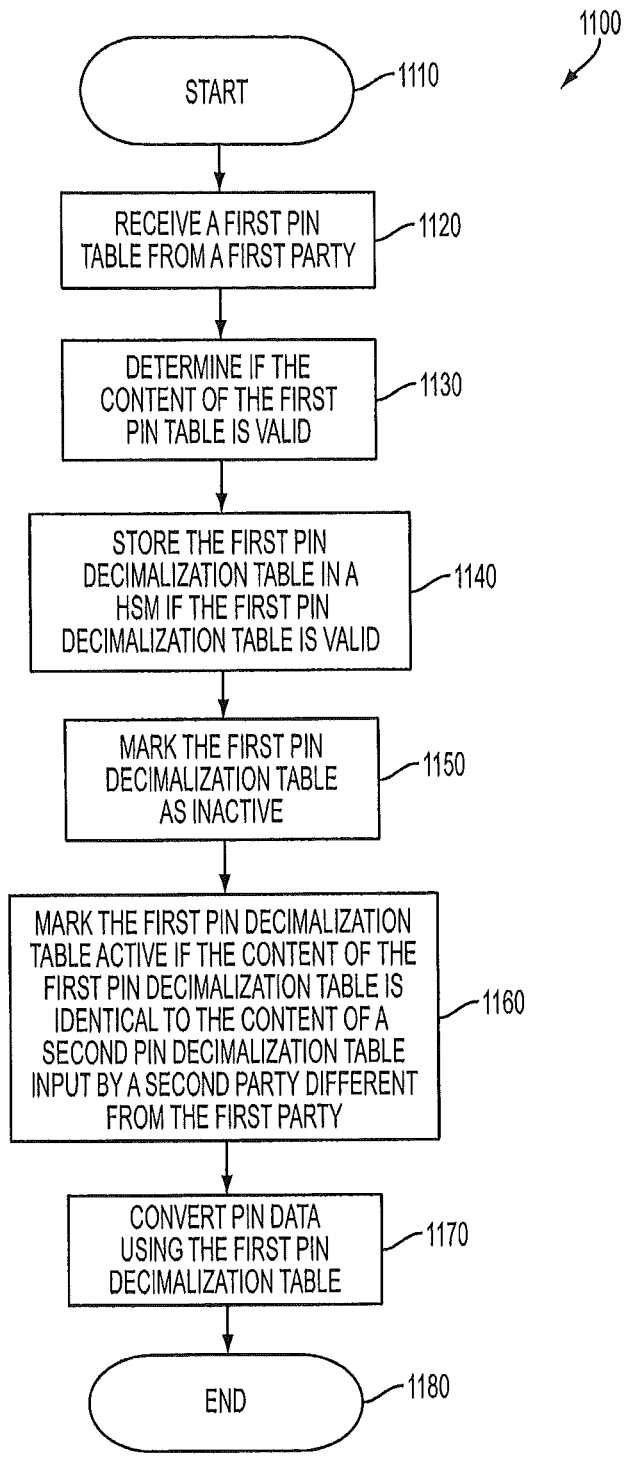
FIG. 11 shows a flowchart of an exemplary embodiment of a process to load and activate a PIN decimalization table by a multiple party access control system.

FIG. 11 shows a flowchart of an exemplary embodiment of a process to load and activate a PIN decimalization table by a multiple party access control system.

A process 1100 includes a block 1110, a block 1120, a block 1130, a block 1140, a block 1150, a block 1160, a block 1170 and a block 1180. In one embodiment, process 1100 may be performed in the host system 106 as shown in FIG. 1.

In the block 1110, process 1100 is started. In one embodiment, process 1100 may be started manually or automatically.

In block 1120, an HSM receives a first PIN decimalization table from a first entity having an input permission.

In block 1130, the HSM determines whether the first PIN decimalization table is valid. In one embodiment, the HSM determines whether the first PIN decimalization table is valid by checking the content of the first PIN decimalization table to require ASCII characters.

In block 1140, the HSM stores the first PIN decimalization table if the content of the first PIN decimalization table is valid.

In block 1150, the HSM marks the stored first PIN decimalization table as inactive.

In block 1160, the HSM activates and marks the first PIN decimalization table active by if a second data structure is input into the HSM by a second entity having an activation permission. The first entity is different from the second entity and the content of the first PIN decimalization table is identical to the content of the second PIN decimalization table.

In block 1170, if activated, the first PIN decimalization table is used to convert an encrypted PIN, which was received and encrypted after a payment card user's input, from a hexadecimal value to a decimal value.

In block 1180, process 1100 ends.

Technical effects and benefits include the ability to better secure a PIN decimalization table by securely storing an approved PIN decimalization table within the HSM and enabling a multiple party control system to invoke functions associated with the PIN decimalization table. Requiring a second approval to invoke functions associated with the stored PIN decimalization table ensures that one insider cannot breach the security of the pre-approved PIN decimalization table. For example, a PIN decimalization table can be protected by storing an approved PIN decimalization table within the HSM and separating permissions (similar to a two-man rule) to load the PIN decimalization table, to activate the PIN decimalization table, to delete the PIN decimalization table and to require use of the validated PIN decimalization table.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method for enhancing security of a personal identification number, the method comprising:
    receiving, from a first entity having an input permission, a first data structure into a hardware security module that comprises a central processing unit, where the first data structure maps a first many-to-one mapping between a first personal identification number numeral system and a second personal identification number numeral system;
    determining, in the hardware security module, whether content of the first data structure is valid;
    storing the first data structure in the hardware security module in response to determining that the content of the first data structure is valid;
    marking, in the hardware security module, the stored first data structure as inactive;
    activating, by marking as active, within the hardware security module, the marked inactive first data structure if a second data structure is input into the hardware security module by a second entity having an activation permission, where the first entity is different from the second entity, the content of the first data structure is identical to content of the second data structure, where the second data structure maps a second many-to-one mapping between the first personal identification number numeral system and the second personal identification number numeral system; and
    converting from the first personal identification number numeral system to the second personal identification number numeral system responsive to the activated first data structure stored in the hardware security module,
    where the first data structure is a first personal identification number decimalization table having a first identifier and the second data structure is a second personal identification number decimalization table having a second identifier and the first data structure is identical to the second data structure if content of the first personal identification number decimalization table is identical to content of the second personal identification number decimalization table and the first identifier is identical to the second identifier.

2. The method of claim 1, wherein the first entity is a first human user and the second entity is a second human user, a first numeral system is a hexadecimal numeral system and a second numeral system is a decimal numeral system.

3. The method of claim 1, wherein the hardware security module further comprises an encryption hardware device, a random access memory device, a persistent memory device and a hardware random number generator.

4. The method of claim 1, further comprising enabling deletion of the first data structure by at least one of the first entity, the second entity or a third entity if the first data structure is marked active or inactive.

5. The method of claim 1, further comprising enabling display of the first data structure stored in the hardware security module and a marking status of the first data structure stored in the hardware security module.

6. The method of claim 5, further comprising enabling validation, wherein the validation includes comparing a third decimalization table provided with a personal identification number block to the first data structure stored in the hardware security module and, upon matching of the third decimalization table provided with the personal identification number block to the first data structure stored in the hardware security module, using the first data structure stored in the hardware security module to generate or verify a personal identification number and, upon mismatching of the third decimalization table provided with the personal identification number block to the first data structure stored in the hardware security module, generating an error message.

7. A computer-implemented method for enhancing security of a personal identification number, the method comprising:
    receiving, from a first entity having an input permission, a first data structure into a hardware security module that comprises a central processing unit, where the first data structure maps a first many-to-one mapping between a first personal identification number numeral system and a second personal identification number numeral system;
    determining, in the hardware security module, whether content of the first data structure is valid;
    storing the first data structure in the hardware security module in response to determining that the content of the first data structure is valid;
    marking, in the hardware security module, the stored first data structure as inactive;
    activating, by marking as active, within the hardware security module, the marked inactive first data structure if a second data structure is input into the hardware security module by a second entity having an activation permission, where the first entity is different from the second entity, the content of the first data structure is identical to content of the second data structure, where the second data structure maps a second many-to-one mapping between the first personal identification number numeral system and the second personal identification number numeral system;
    converting from the first personal identification number numeral system to the second personal identification number numeral system responsive to the activated first data structure stored in the hardware security module;
    enabling display of the first data structure stored in the hardware security module and a marking status of the first data structure stored in the hardware security module; and
    enabling validation, where the validation includes comparing a third decimalization table provided with a personal identification number block to the first data structure stored in the hardware security module and, upon matching of the third decimalization table provided with the personal identification number block to the first data structure stored in the hardware security module, using the first data structure stored in the hardware security module to generate or verify a personal identification number and, upon mismatching of the third decimalization table provided with the personal identification number block to the first data structure stored in the hardware security module, generating an error message.

* * * * *